United States Patent
Huang et al.

(10) Patent No.: US 12,160,350 B2
(45) Date of Patent: Dec. 3, 2024

(54) DYNAMIC QUALITY OF SERVICE TRAFFIC STEERING IN A MULTI-ACCESS EDGE COMPUTING ENVIRONMENT

(71) Applicant: VERIZON PATENT AND LICENSING INC., Basking Ridge, NJ (US)

(72) Inventors: Ye Huang, San Ramon, CA (US); Ali Imdad Malik, East Brunswick, NJ (US); Miguel A. Carames, Long Valley, NJ (US); Hossein M. Ahmadi, Parsippany, NJ (US); Sudhakar Reddy Patil, Flower Mound, TX (US); Alexander Fadeev, Summit, NJ (US); Jason Logan Anderson, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 30 days.

(21) Appl. No.: 17/520,806

(22) Filed: Nov. 8, 2021

(65) Prior Publication Data

US 2023/0144248 A1    May 11, 2023

(51) Int. Cl.
*H04L 41/5009* (2022.01)
*H04L 67/148* (2022.01)
(Continued)

(52) U.S. Cl.
CPC ........ *H04L 41/5009* (2013.01); *H04L 67/148* (2013.01); *H04L 67/289* (2013.01); *H04L 41/5054* (2013.01); *H04L 45/302* (2013.01)

(58) Field of Classification Search
CPC ............ H04L 41/5003; H04L 41/5009; H04L 41/5019; H04L 41/5025; H04L 41/5054;
(Continued)

(56) References Cited

U.S. PATENT DOCUMENTS 10,841,974 B1 * 11/2020 Young ................... H04W 36/12
10,979,534 B1 *  4/2021 Parulkar ................. H04L 67/10
(Continued)

FOREIGN PATENT DOCUMENTS

EP           3896572 A1 * 10/2021   ......... H04L 41/5025

OTHER PUBLICATIONS

Taleb, Tarik, et al. "On multi-access edge computing: A survey of the emerging 5G network edge cloud architecture and orchestration." IEEE Communications Surveys & Tutorials 19.3 (2017): 1657-1681. (Year: 2017).*

(Continued)

*Primary Examiner* — Vivek Srivastava
*Assistant Examiner* — William C McBeth

(57) ABSTRACT

A quality of service traffic steering approach for multi-access edge computing (MEC) environments is disclosed. In an embodiment, a network exposure function (NEF) or similar device (e.g., MEC controller or orchestrator) monitors a quality of service (QoS) of a data session between a user equipment (UE) and an application. The NEF then can determine when the QoS of the data session does not meet a requested service level agreement (SLA). When the SLA is not met, the NEF identifies a MEC host that meets the SLA using a database of MEC applications. Based on the identified MEC host, the NEF re-routes the data session to the MEC host.

20 Claims, 5 Drawing Sheets

(51) Int. Cl.
*H04L 67/289* (2022.01)
*H04L 41/5054* (2022.01)
*H04L 45/302* (2022.01)

(58) Field of Classification Search
CPC ....... H04L 45/302; H04L 67/10; H04L 67/14; H04L 67/141; H04L 67/148; H04L 67/289; H04L 67/1008; H04L 67/101; H04L 67/1012; H04L 67/1021; H04L 67/1027; H04W 24/00; H04W 24/02; H04W 24/04; H04W 24/10; H04W 36/0011; H04W 36/0016; H04W 36/0019; H04W 36/0033
See application file for complete search history.

(56) References Cited

U.S. PATENT DOCUMENTS

| | | | | |
|---|---|---|---|---|
| 2018/0262924 A1* | 9/2018 | Dao | | H04W 72/535 |
| 2019/0053108 A1* | 2/2019 | Trang | | H04L 67/148 |
| 2020/0112907 A1* | 4/2020 | Dao | | H04M 15/8016 |
| 2020/0136978 A1* | 4/2020 | Li | | H04L 67/148 |
| 2020/0169857 A1* | 5/2020 | Yang | | H04L 41/5009 |
| 2020/0196203 A1* | 6/2020 | Yang | | H04W 36/0033 |
| 2020/0275313 A1* | 8/2020 | He | | H04W 28/0838 |
| 2020/0322233 A1* | 10/2020 | Gao | | H04L 41/5019 |
| 2020/0351637 A1* | 11/2020 | Wang | | H04L 67/30 |
| 2020/0351724 A1* | 11/2020 | Guo | | H04W 36/0064 |
| 2020/0366567 A1* | 11/2020 | Li | | H04L 41/5003 |
| 2020/0374974 A1* | 11/2020 | Sun | | H04L 41/5019 |
| 2020/0389531 A1* | 12/2020 | Lee | | H04L 67/52 |
| 2020/0404069 A1* | 12/2020 | Li | | H04L 67/289 |
| 2020/0404547 A1* | 12/2020 | Qiao | | H04L 43/087 |
| 2021/0028992 A1* | 1/2021 | Chang | | H04L 67/10 |
| 2021/0105191 A1* | 4/2021 | Yang | | G06F 11/3409 |
| 2021/0126840 A1* | 4/2021 | Venkataramu | | H04L 41/5019 |
| 2021/0136870 A1* | 5/2021 | Panchal | | H04L 67/14 |
| 2021/0153041 A1* | 5/2021 | Parvataneni | | H04W 24/02 |
| 2021/0168027 A1* | 6/2021 | Parulkar | | H04L 67/148 |
| 2021/0243264 A1* | 8/2021 | Yoon | | H04L 41/5022 |
| 2021/0243580 A1* | 8/2021 | Wang | | H04L 67/10 |
| 2021/0314906 A1* | 10/2021 | Matolia | | H04W 64/006 |
| 2021/0320850 A1* | 10/2021 | Young | | H04L 41/5009 |
| 2021/0400568 A1* | 12/2021 | Chaysinh | | H04L 65/80 |
| 2022/0060942 A1* | 2/2022 | Jeon | | H04L 41/5025 |
| 2022/0116814 A1* | 4/2022 | Di Girolamo | | H04L 41/5009 |
| 2022/0166723 A1* | 5/2022 | Sabella | | H04W 4/24 |
| 2022/0171648 A1* | 6/2022 | Rodriguez | | G06F 9/5072 |
| 2022/0256390 A1* | 8/2022 | Sun | | H04L 47/2408 |
| 2022/0264690 A1* | 8/2022 | Zhu | | H04L 67/148 |
| 2022/0329648 A1* | 10/2022 | De Foy | | H04L 67/10 |
| 2022/0345929 A1* | 10/2022 | Lee | | H04L 67/14 |
| 2022/0377598 A1* | 11/2022 | Pan | | H04W 28/0268 |
| 2023/0074288 A1* | 3/2023 | Filippou | | H04W 24/04 |
| 2023/0217360 A1* | 7/2023 | Karampatsis | | H04W 24/10 370/329 |

OTHER PUBLICATIONS

Choi, Young-il, and Noik Park. "Support for edge computing in the 5G network." 2018 Tenth International Conference on Ubiquitous and Future Networks (ICUFN). IEEE, 2018. (Year: 2018).*
Zhu et al., WO 2020/232404 A1, Nov. 2020, WIPO, (Year: 2020).*
Yadhav et al., WO 2021/173046 A1, Sep. 2021, WIPO, (Year: 2021).*
Tzanakaki, Anna, et al. "Mobility aware Dynamic Resource management in 5G Systems and Beyond." 2021 International Conference on Optical Network Design and Modeling (ONDM). IEEE, 2021. (Year: 2021).*
Velrajan, Saravanan, and V. Ceronmani Sharmila. "QoS management in multi-access edge compute." 2021 5th International Conference on Computing Methodologies and Communication (ICCMC). IEEE, 2021. (Year: 2021).*
3GPP. "System architecture for the 5G system." 3GPP TS 23.501 V17.2.0. Sep. 2021, pp. 129 and 213-214 (Year: 2021).*
Alvarez et al., WO 2021/180341 A1, Sep. 16, 2021, WIPO, (Year: 2021).*
Hoffman, WO 2021/260420 A1, Dec. 30, 2021, WIPO, (Year: 2021).*
Filali, Abderrahime, et al. "Multi-access edge computing: A survey." IEEE Access 8 (2020): 197017-197046. (Year: 2020).*
Shetty, Rajaneesh Sudhakar, and Rajaneesh Sudhakar Shetty. "Multi-Access Edge Computing in 5G." 5G Mobile Core Network: Design, Deployment, Automation, and Testing Strategies (2021): 69-102. (Year: 2021).*

* cited by examiner

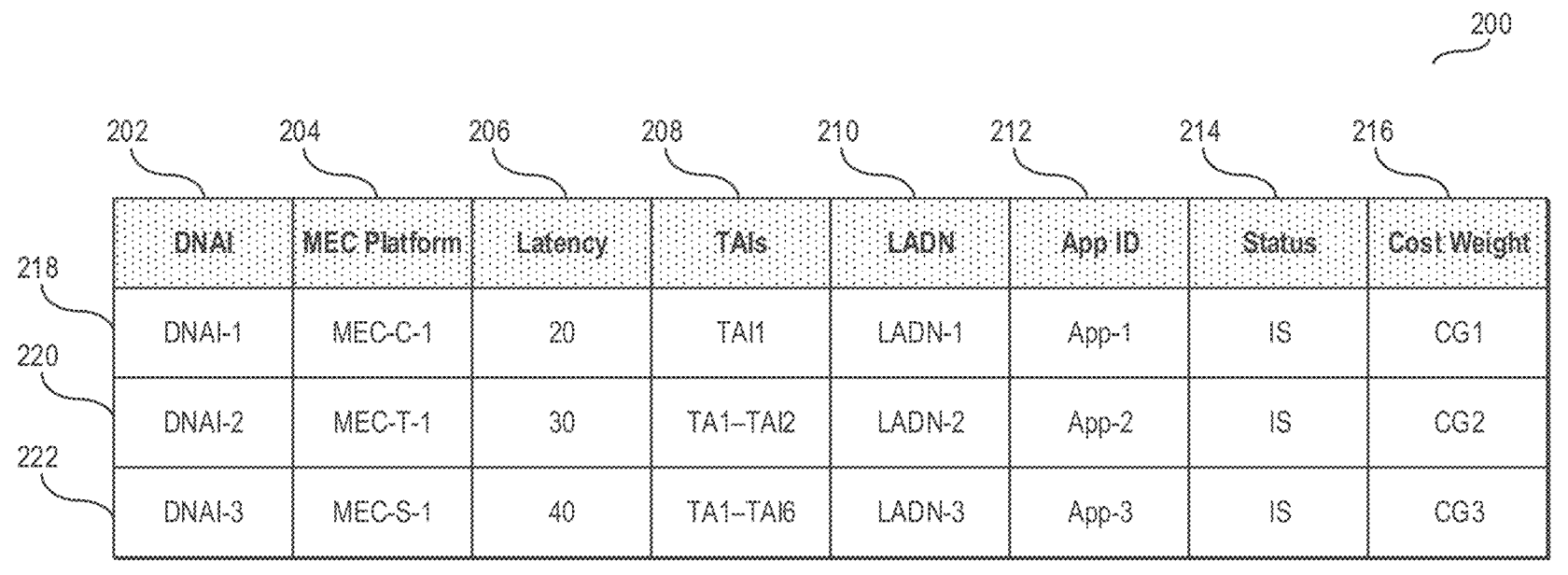

| DNAI | MEC Platform | Latency | TAIs | LADN | App ID | Status | Cost Weight |
|---|---|---|---|---|---|---|---|
| DNAI-1 | MEC-C-1 | 20 | TAI1 | LADN-1 | App-1 | IS | CG1 |
| DNAI-2 | MEC-T-1 | 30 | TAI1-TAI2 | LADN-2 | App-2 | IS | CG2 |
| DNAI-3 | MEC-S-1 | 40 | TAI1-TAI6 | LADN-3 | App-3 | IS | CG3 |

FIG. 2

DYNAMIC QUALITY OF SERVICE TRAFFIC STEERING IN A MULTI-ACCESS EDGE COMPUTING ENVIRONMENT

BACKGROUND INFORMATION

Multi-access edge computing (MEC) environments provide computing capabilities at the edge of the network. Currently, user equipment (UE) and MEC traffic is not steered based on a detected quality of service (QoS) of a data session or a detected latency. As a result, current MEC deployments may not optimize network resource utilization.

BRIEF DESCRIPTION OF THE DRAWINGS

FIG. 2 is a database diagram of a MEC Service Level Agreement (SLA) database according to some of the example embodiments.

DETAILED DESCRIPTION OF EXAMPLE EMBODIMENTS

The various embodiments describe techniques for performing traffic steering of MEC data sessions based on measured data session QoS indicators. In the various embodiments, a network exposure function (NEF) (or MEC controller or orchestrator) may monitor the QoS of an established data session with a MEC application. When the NEF determines that the observed/measured QoS falls below a certain predetermined SLA (e.g., a latency requirement), the NEF may initiate a re-routing of the data session to a MEC platform closer to the UE. To do so, the NEF can utilize a database of MEC application instances and identify a new MEC application instance that will satisfy the SLA requirements. The NEF may then re-route the traffic via a Traffic Influence message and continue monitoring QoS conditions to determine if the performance requirements are met or whether further re-routing is needed.

Figure 1:
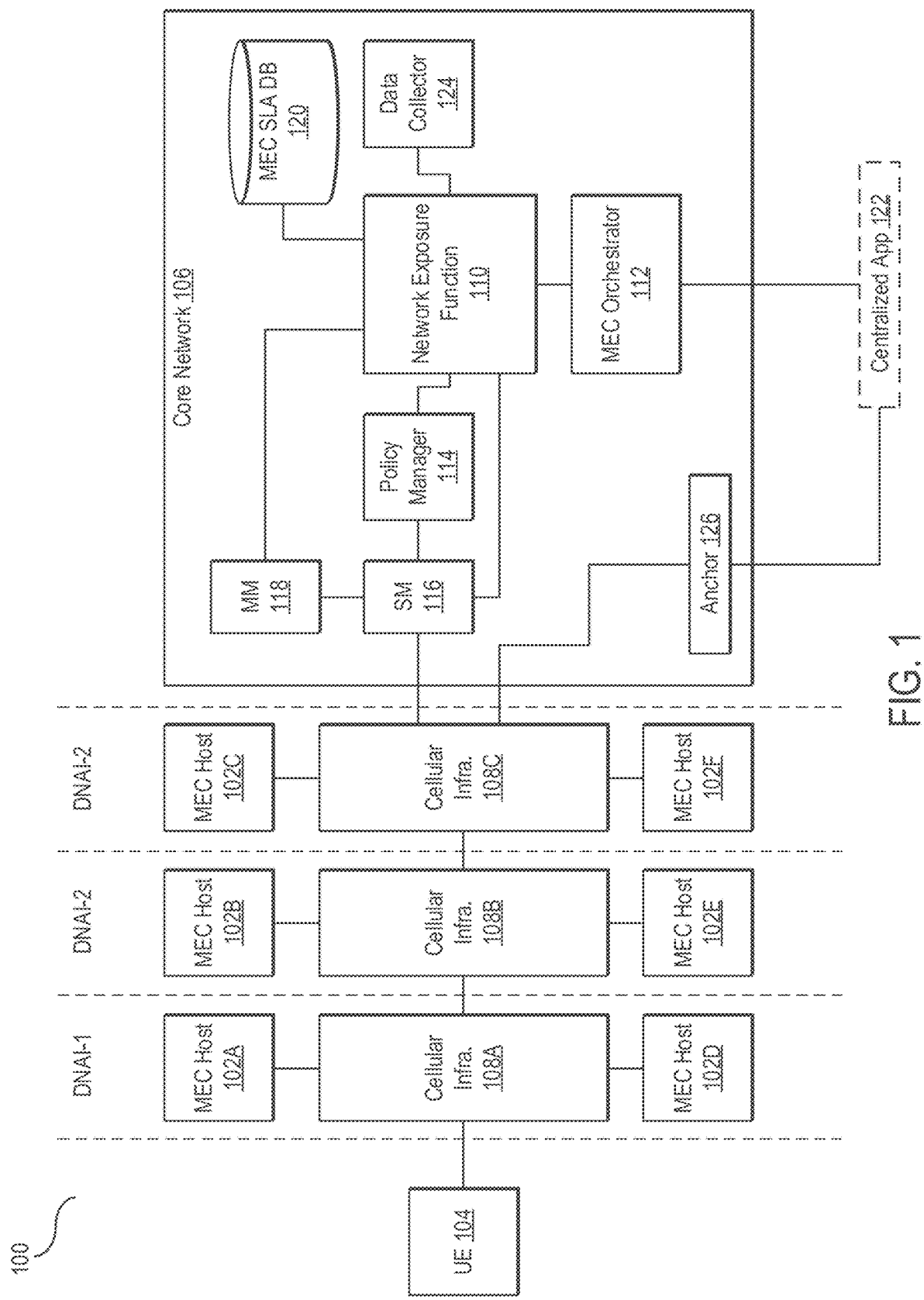
FIG. 1 is a block diagram of a cellular network used in the various embodiments.

FIG. 1 is a block diagram of a cellular network 100 used in the various embodiments.

In an embodiment, a cellular network 100 includes a plurality of MEC local area data network (LADN) instances or hosts, including MEC host 102A, MEC host 102B, MEC host 102C, MEC host 102D, MEC host 102E, and MEC host 102F. In an embodiment, a given MEC host can comprise an entity that contains a MEC platform and a virtualization infrastructure which provides compute, storage, and network resources, for the purpose of running MEC applications. In an embodiment, a MEC platform can comprise a collection of functions required to run MEC applications on a particular virtualization infrastructure and enable the applications to provide and consume MEC services. A MEC host can run zero or more MEC applications (also referred to as MEC application instances). A given MEC application can comprise an application instantiated on the virtualization infrastructure of the MEC host based on configuration or requests validated by a MEC orchestrator. In an embodiment, a MEC host includes a session anchor which terminates a data session between two network endpoints within the cellular network 100 (e.g., the MEC platform and other network functions in the cellular network 100).

The MEC hosts 102 can be distributed at various depths of the cellular network 100. As used herein, a depth refers to a location within the cellular network 100 based on its proximity to a given UE. As used herein, a proximity of a given UE to a MEC host refers to a real or perceived latency between the UE and the MEC host. In an embodiment, depths of a cellular network 100 are assigned data network access identifier (DNAI) values. In an embodiment, the cellular network 100 can include three DNAIs: DNAI-1, DNAI-2, DNAI-3. Each DNAI includes a corresponding cellular infrastructure to support data, voice, and other communications. For example, DNAI-1 can include cellular infrastructure 108A, DNAI-2 can include cellular infrastructure 108B, and DNAI-3 can include cellular infrastructure 108C. The specific details of the cellular infrastructure are not limiting and vary based on the depth of the infrastructure. As one example, DNAI-1 can comprise radio access network (RAN) depth (e.g., hardware implementing RAN infrastructure such as gNodeB devices) while DNAI-2 and DNAI-3 can comprise more centralized depths such as service access point (SAP) or terminal access point (TAP) layers of cellular network 100 that aggregate traffic from layers closer to UE. Although only three depths are illustrated, other depths can be implemented. In general, communications between a UE and a depth closer (e.g., a depth having a lower real or perceived latency or, alternatively, a depth selected via a shortest path algorithm) to the UE experience lower latency than communications between a UE and a depth closer to the core network 106. As one example, the latency between UE 104 and MEC Host 102A may be an average of twenty milliseconds, the latency between UE 104 and MEC host 102B may be an average of thirty milliseconds, the latency between UE 104 and MEC host 102C may be an average of forty milliseconds, and the latency between UE 104 and core network 106 may be an average of sixty milliseconds. Thus, when a given UE communicates with an application deployed on MEC Host 102A, the user experiences less latency than that of MEC Host 102B.

In some embodiments, a centralized application 122 is located outside of a core network 106. In other embodiments, centralized application 122 can be located within the core network 106. The centralized application 122 can comprise any network application that provides data to UE (e.g., UE 104) communicatively coupled to the cellular network 100. As illustrated, centralized application 122 can comprise a single server (or cluster of servers) that provides data to UE regardless of the locations of the UEs. For example, centralized application 122 can comprise a video streaming service that provides streaming video to UE in response to network requests. In some scenarios, a UE can communicate directly with the centralized application 122. In such a scenario, an anchor 126 is provided to allow the centralized application 122 to communicate with UEs through the cellular network 100.

The centralized application 122 is further communicatively coupled to a MEC orchestrator (MECO 112). In an embodiment, the MECO 112 provides system-level management of the MEC system. In an embodiment, the MECO 112 can maintain an overall view of the MEC system based on deployed MEC hosts, available resources, available MEC services, and topology. In an embodiment, the MECO 112 can onboard application packages, including checking the integrity and authenticity of the packages. In an embodiment, the MECO 112 can validate application rules and requirements and, if necessary, adjusting them to comply with operator policies. In an embodiment, the MECO 112 can keep a record of onboarded packages and prepare the virtualization infrastructure manager to host the applications. In an embodiment, the MECO 112 can select appropriate MEC instances for application instantiation based on constraints, such as latency, available resources, and available services. In an embodiment, the MECO 112 can trigger application instantiation and termination. In an embodiment, the MECO 112 can trigger application relocation as needed when supported.

In an embodiment, the MECO 112 can receive requests from centralized application 122 to provision MEC application instances of the centralized application 122 in the various MEC hosts throughout the cellular network 100. In an embodiment, the MECO 112 communicates with a network exposure function (NEF) 110 to fulfill such requests. In an embodiment, the NEF 110 comprises a network function that securely exposes services and capabilities of the cellular network. In an embodiment, the MECO 112 can issue a create session request to the NEF 110 to instantiate a new instance of the centralized application 122 in a given MEC host. In some embodiments, the create session request can include a UE identifier to establish a UE to MEC Host data session. In some embodiments, the create session request can additionally include a desired service level agreement (SLA) for the session. In some embodiments, the desired SLA in the create session request can include a plurality of parameters. In some embodiments, the plurality of parameters can include a desired QoS level and latency value.

In response to such a create session request, the NEF 110 can create a session by transmitting a second create session request message to policy manager 114. In an embodiment, the policy manager 114 can comprise a policy control function (PCF) of a 5G network. In an embodiment, the create session request message transmitted by NEF 110 to policy manager 114 can comprise a message to setup a session with a required quality of service. In some embodiments, the create session request message transmitted by NEF 110 to policy manager 114 can include a requested SLA (e.g., quality of service class identifier (QCI) value and/or latency). In some embodiments, the session created by NEF 110 can comprise a session between a UE and the centralized application 122.

The NEF 110 can further create a subscription with a data collector 124 to receive periodic updates regarding latency and other channel parameters. In some embodiments, the updates can include data such as the trending or trajectory QoS or latency. In some embodiments, the periodic updates can be received on a periodic update. In other embodiments, the periodic updates can be received when the data exceeds a preconfigured threshold. In some embodiments, the NEF 110 can compare data received from data collector 124 to real-time QoS feedback from session manager 116 to prevent over-calibration or burst-like changes based solely on the real-time QoS feedback. Specifically, real-time data may indicate the need for an instantaneous change but may also indicate a temporary fluctuation. By combining real-time data with longer term trends, NEF 110 can prevent overfitting by tempering short-term changes with longer-term trends.

In an embodiment, the data collector 124 can comprise a Network Data Analytics Function (NWDAF) in a 5G network. In an embodiment, the data collector 124 can comprise a network function that can collect data from UE, other network functions, and operations, administration, and maintenance (OAM) systems, etc., from the cellular network that can be used for analytics and similar purposes. In some embodiments, the NEF 110 can provide a UE identifier and/or slice identifier (e.g., NSSAI or DNN) to the data collector 124. In some embodiments, the NEF 110 can further provide a target QoS flow identifier or similar measure. In some embodiments, the data collector 124 can report QoS values (e.g., QoS class identifier (QCI) values) in a publish-subscribe manner. That is, when a QCI for a given UE and QoS flow changes, the data collector 124 can publish the change to NEF 110, and the NEF 110 can consume the change (as discussed). In some embodiments, the data collector 124 may only publish QCI changes if the QCI falls below a desired threshold. Thus, if the QCI is above a preconfigured minimum, the data collector 124 may not report QCI changes, thus reducing unnecessary fluctuations of QoS measurements.

After the above two operations, a session is established between the UE and centralized application 122, and the NEF 110 can monitor channel quality to determine if the desired SLA is being met. Thus, the core network 106 will, at first, default to a centralized deployment of a given application while the requested SLA is met. However, if the QCI or latency of a given session falls below the requested SLA/QCI, the core network 106 will then instantiate a MEC application instance of the centralized application 122, as discussed next.

In an embodiment, the core network includes a session manager 116. In an embodiment, the session manager 116 can comprise a Session Management Function (SMF) and User Plane Function (UPF) of a 5G network. Alternatively, the session manager 116 can comprise a serving gateway (S-GW) of a 4G network. In an embodiment, the session manager 116 can provide all management functions of data sessions existing in the cellular network 100. In general, the session manager 116 routes and forwards user data packets while also acting as the mobility anchor for the user plane during access point handovers and as the anchor for mobility between different network technologies.

In the illustrated embodiment, the session manager 116 can additionally provide periodic QoS reports for data sessions established in the cellular network 100. In some embodiments, the QoS report can comprise a standard QoS report transmitted by the UPF to an SMF in a 5G network. However, in the illustrated embodiment, the QoS report can be augmented including but not limited to UE location data. In some embodiments, the UE location data can be received or retrieved from the mobility manager (MM) (118) when the QoS report is generated. In some embodiments, the UE location information can be included in a dedicated Information Element (IE) of a QoS Information field of the QoS report.

In an embodiment, the NEF 110 periodically receives QoS reports from session manager 116 and SLA notifications from data collector 124. In the illustrated embodiment, the NEF 110 can utilize the data received from data collector 124 to throttle processing QoS reports from session manager 116. That is, since the session manager 116 may provide a constant stream of QoS reports (including a UE location), the data from data collector 124 can be used to selectively process the QoS reports for MEC deployment only when the SLA is not met (as indicated in the notifications from the data collector 124).

When the NEF 110 determines that an SLA is not being met (based on the data transmitted by data collector 124), the NEF 110 reads the UE location from the QoS report transmitted by session manager 116 and uses both the desired SLA and the UE location to identify a MEC host to deploy the centralized application 122. Specifically, in an embodiment, the NEF 110 queries a MEC SLA database 120 to identify a corresponding DNAI to deploy the centralized application 122 (or route the UE to an already-deployed instance of the centralized application 122).

FIG. 2 is a database diagram of a MEC SLA database 200 according to some of the example embodiments.

The illustrated MEC SLA database 200 includes a plurality of rows, including row 218, row 220, and row 222. The specific number of rows is not limiting, and more or fewer rows may be present in the MEC SLA database 200.

Each row includes a plurality of fields associated with a corresponding plurality of columns. In the illustrated embodiment, the columns include a DNAI column 202, a MEC platform column 204, a latency column 206, a tracking area identity (TAI) column 208, a LADN column 210, an application identifier column 212, an application status column 214, and a cost weight column 216.

In the illustrated embodiment, each MEC application (represented by application identifier column 212) can be associated with a given row. Thus, the MEC SLA database 200 includes a complete view of all available MEC applications running (e.g., deployed and/or instantiated) in a cellular network.

In an embodiment, the application identifier column 212 comprises a unique identifier associated with a MEC application. As discussed, a given MEC application can comprise multiple instances; however, each of the multiple instances can be associated with the same application identifier. In other embodiments, multiple MEC application instances can be assigned unique identifiers based on a shared application identifier and an instance identifier.

In an embodiment, the DNAI column 202 comprises an identification of the DNAI that a given MEC application instance or application is instantiated in. In an embodiment, the DNAI corresponds to a given depth in a cellular network (e.g., DNAI-1, DNAI-2, DNAI-3, as discussed in FIG. 1). Further, each row is associated with a MEC platform column 204, identifying the MEC platform managing the corresponding instance identified by the application identifier column 212. Further, each row is associated with a LADN column 210 that identifies a given data network for a corresponding MEC platform. The combination of application identifier column 212, DNAI column 202, MEC platform column 204, and LADN column 210 define the physical and virtualization identity of a given MEC application instance.

In an embodiment, the MEC SLA database 200 further includes a latency column 206 that stores the observed latency of a given instance based on the position of the instance in a cellular network. In some embodiments, latency column 206 can store alternative latency measurements for instances such estimated or anticipated latency. In some embodiments, the latency column 206 can comprise static values, while in other embodiments, the latency column 206 can be updated based on measured latencies throughout the cellular network. A TAI column 208 comprises a list of tracking areas that a given MEC application instance can reach. As used herein, a TAI comprises an identifier of the geographic coverage of a given DNAI. For example, a RAN TAI (such as in row 218) may correspond to a single base station and thus only includes a single TAI. More centralized DNAIs (as in row 220 and row 222) can cover more TAIs (at the expense of higher latency) given that these DNAIs are closer to the core network and thus communicate with multiple base stations and intervening network infrastructure.

The MEC SLA database 200 further includes an application status column 214 that indicates the operational status of a given MEC application instance. The application status column 214 can indicate whether a given MEC application instance is in service ("IS") or out of service ("OS"). If a MEC application instance is out of service, a NEF 110 can identify this fact and instantiate a MEC application instance (and thus update the application status column 214 to in-service).

Finally, the MEC SLA database 200 includes a cost weight column 216 that provides a comparable metric of costs for deploying a MEC application to a given MEC host. In some embodiments, the cost can be a monetary cost; however other comparable metrics may be used. Specifically, any value that can be comparable may be used such that the NEF 110 can rank the rows based on the values stored in cost weight column 216.

Returning to FIG. 1, the NEF 110 can filter the data in the MEC SLA database to first identify an existing instantiation of the centralized application (e.g., via an application identifier). Next, the NEF 110 can filter the data in the MEC SLA database to identify those instantiations that meet the required SLA (via converting the SLA to a latency value). Finally, the NEF 110 can sort the matching data in the MEC SLA database to identify the lowest cost application instantiation. In some embodiments, if the NEF 110 cannot locate an instantiated application instance, the NEF 110 can notify the MECO 112 to instantiate a new instance based on the desired location (e.g., SLA). Once the application instance is instantiated (or an existing instance is found), the NEF 110 will initiate the re-routing of a data session from centralized application 122 to a given MEC host containing the MEC application instance.

In an embodiment, the NEF 110 can issue a request (e.g., Traffic Influence request) to the session manager 116 via the policy manager 114 to establish a new data session with a dedicated bearer connection to the MEC host identified using the MEC SLA database 120. In some embodiments, the request can include the required SLA/QoS requirements of the MEC application. The NEF 110 can then re-execute the above operations to monitor the newly established bearer connection and re-route the newly established connection upon detecting a change in QoS and failure to meet the requested SLA. The NEF 110 can continuously execute these operations during the lifetime of the data session between a UE and a centralized application. Details of re-routing a data session are described more fully in the description of step 316 of FIG. 3.

The illustrated cellular network 100 can include additional components than those illustrated to implement other cellular network features not relevant to the disclosure. The specific arrangement and configuration of components are thus not limited to that depicted in FIG. 1, and implementation of the example embodiments may include other such components. Further, the various components illustrated in FIG. 1 may perform other functions not directly impacting the functions discussed herein, and the cellular network 100 should not be construed as being limited only to the disclosed functions.

Figure 3:
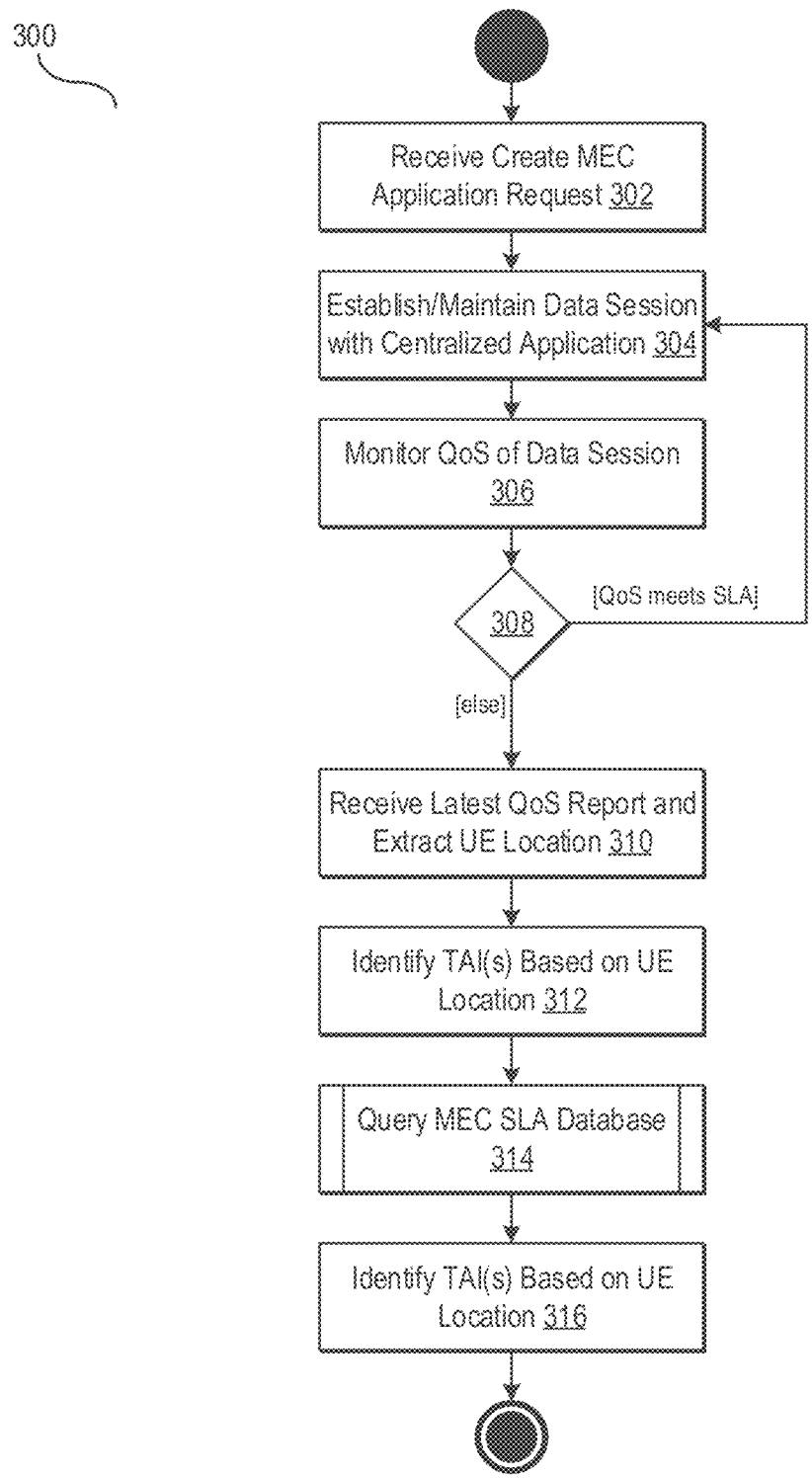
FIG. 3 is a flow diagram illustrating a method for QoS-based traffic steering in a MEC environment according to some of the example embodiments.

FIG. 3 is a flow diagram illustrating a method (300) for QoS-based traffic steering in a MEC environment according to some of the example embodiments.

In step 302, the method (300) can include receiving a request to create a MEC application in a cellular network.

In an embodiment, the method (300) can receive requests from external customers to create MEC-enabled applications. In general, a MEC application will include a centralized application (e.g., an application running in a customer data center or hosted in a single location by the mobile network operator, MNO). However, the centralized application will be configured to be deployed in additional locations (e.g., MEC hosts) based on the traffic conditions and requirements of the external customer.

In some embodiments, the request to create a MEC application can be issued by a MECO. In some embodiments, the MECO can be operated by an MNO. Alternatively, or in conjunction with the foregoing, the MECO can be operated by a third-party, e.g., cloud service providers, or the external customer themselves.

In some embodiments, the request to create a MEC application can include a UE type or UE group type, a set of data or Internet Protocol flows, a flag indicating that orchestration is requested by the MNO, and an SLA. In an embodiment, an SLA can be represented by a label (e.g., "SLA1", "SLA2", etc.), and the MNO can map SLA symbols to QoS Identifiers (e.g., a 5G QoS identifier, 5QI) and/or target latency values (in, for example, milliseconds). In some embodiments, the MNO can utilize a table mapping SLA label to the above values (or other values).

In step 304, the method (300) can include establishing and maintaining a data session with a centralized application.

In an embodiment, the method (300) can include issuing a session creation message to a policy manager (e.g., a PCF) that includes the parameters of the message received from the MECO. In an embodiment, the session creation message can comprise an application server (AS) session with QoS (AsSessionWithQoS) message. In some embodiments, the session creation message can include QoS monitoring criteria (e.g., uplink, downlink, and round-trip delay thresholds) based on the values associated with a given SLA label. In some embodiments, the QoS monitoring criteria can be used to govern the transmission of QoS reports described herein.

In step 306, the method (300) can include monitoring the QoS of the data session established in step 304.

In one embodiment, the method (300) can monitor the QoS of the data session by subscribing to notifications from a data collector such as an NWDAF function. In an embodiment, the data collector is configured to receive reports of network congestion from various components of the cellular network. For example, RAN base stations can periodically report network congestion (e.g., latency, QCIs, etc.) to the data collector. The data collector can store these reported metrics and push the metrics to subscribers (e.g., method 300) via a publish-subscribe connection. In some embodiments, the data collector can push metrics upon receipt. In other embodiments, the data collector can aggregate metrics over a reporting period (e.g., one minute) and publish aggregate metrics.

In some embodiments, the method (300) can simultaneously and asynchronously receive QoS reports from a session manager (e.g., SMF). As described, the QoS reports can include instantaneous QoS data comprising standard QoS report transmitted by the UPF to an SMF in a 5G network. Additionally, the QoS report can be augmented to include a UE location. In some embodiments, the reports from the session manager and the publish-subscribe metrics are not synchronized, and, indeed, the publish-subscribe metrics comprise trends of channel congestion. Specifically, in some embodiments, the QoS reports may indicate a congested base station or RAN due to their instantaneous nature. However, such congestion may be short-lived and thus not merit the relocation of MEC applications. Thus, the method (300) utilizes longer-term trends as monitored by the data collector to prevent unnecessary re-routing of UE. That is, if the congestion indicated in the QoS report only indicates a brief (e.g., one millisecond) period of congestion, while at all other times, the RAN is not experiencing congestion, re-routing based solely on this instantaneous measurement would be unnecessary. Furthermore, once re-routed, the same decision could be made for the new route, thus causing a resonating effect where the cellular network is constantly re-routing data sessions. Thus, the use of trending and long-term QoS trends for the specific UE can be used to throttle data session relocation until necessary. In some embodiments, the instantaneous QoS measurements can be used as a "check" when the publish-subscribe metrics indicate a deteriorating data session quality.

In step 308, the method (300) can include determining if the QoS of the data session established in step 304 meets a requested SLA. If so, the method (300) can return to step 304 and maintain the data session (step 304) and keep monitoring the QoS (step 306).

In an embodiment, the method (300) uses the publish-subscribe metrics and the QoS report to determine the true (or near-term) QoS of the data session. In some embodiments, the method (300) can determine a 5QI or other quantifiable metric representing the channel quality. The method (300) can then read the requested SLA (received in step 302) to determine if the current QoS meets the channel quality metric associated with the requested SLA.

In step 310, the method (300) can include receiving the latest QoS report for the data session and extracting the UE location from the QoS report. As described above, in some embodiments, the QoS report can be periodically reported to the method from, for example, the session manager. The QoS report can include a UE location. In some embodiments, the UE location can comprise a LocationData type that includes one or more of a geographic area, civic address, Global Navigation Satellite System (GNSS) position data, altitude, velocity, etc.

In step 312, the method (300) can include identifying one or more TAIs based on the UE location. In some embodiments, based on the UE location, the method (300) can identify one or more corresponding TAIs for the UE location. In some embodiments, the method (300) can identify a single closest TAI (e.g., RAN TAI) for a given UE. In other embodiments, the method (300) can identify a series of TAIs having larger areas (e.g., corresponding to DNAI-1, DNAI-2, DNAI-3, etc. in FIG. 1). In some embodiments, the method (300) can utilize a network topology to map UE locations to TAI identifiers.

In step 314, the method (300) can include querying a MEC SLA database to identify a MEC platform. Details of step 314 are provided in FIG. 4. In brief, when the method (300) determines that the channel quality (i.e., QoS) has deteriorated to the point that re-routing is necessary, the method (300) extracts query parameters in the form of an application identifier, TAI(s), and SLA symbols and uses these parameters to query a database of MEC applications. The database stores the current state of all MEC applications running in the cellular network and can be used to identify an optimal MEC application in which to re-route the UE data session.

In step 316, the method (300) can include re-routing the data session from the centralized application to the MEC platform.

In an embodiment, the method (300) can issue a Traffic Influence request to a session manager (via policy manager) to cause a re-routing of the data session to the new MEC application. In one embodiment, the Traffic Influence request can include one or more target UE identifiers, a traffic description (i.e., an AF-ServiceIdentifier or combination of DNN and optionally S-NSSAI, and application identifier or traffic filtering information), one or more DNAI identifiers of the new MEC locations (e.g., MEC platforms).

In some embodiments, the Traffic Influence request can further be extended to include a QoS monitoring request. In an embodiment, the QoS monitoring request can define the type of QoS measurements to be performed by the session manager. That is, in some embodiments, the QoS monitoring request can cause the session manager to re-enable the QoS reporting (including UE location) that was in place for the previous data session. This QoS monitoring request allows for continuous re-routing of data sessions when network congestion arises.

Figure 4:
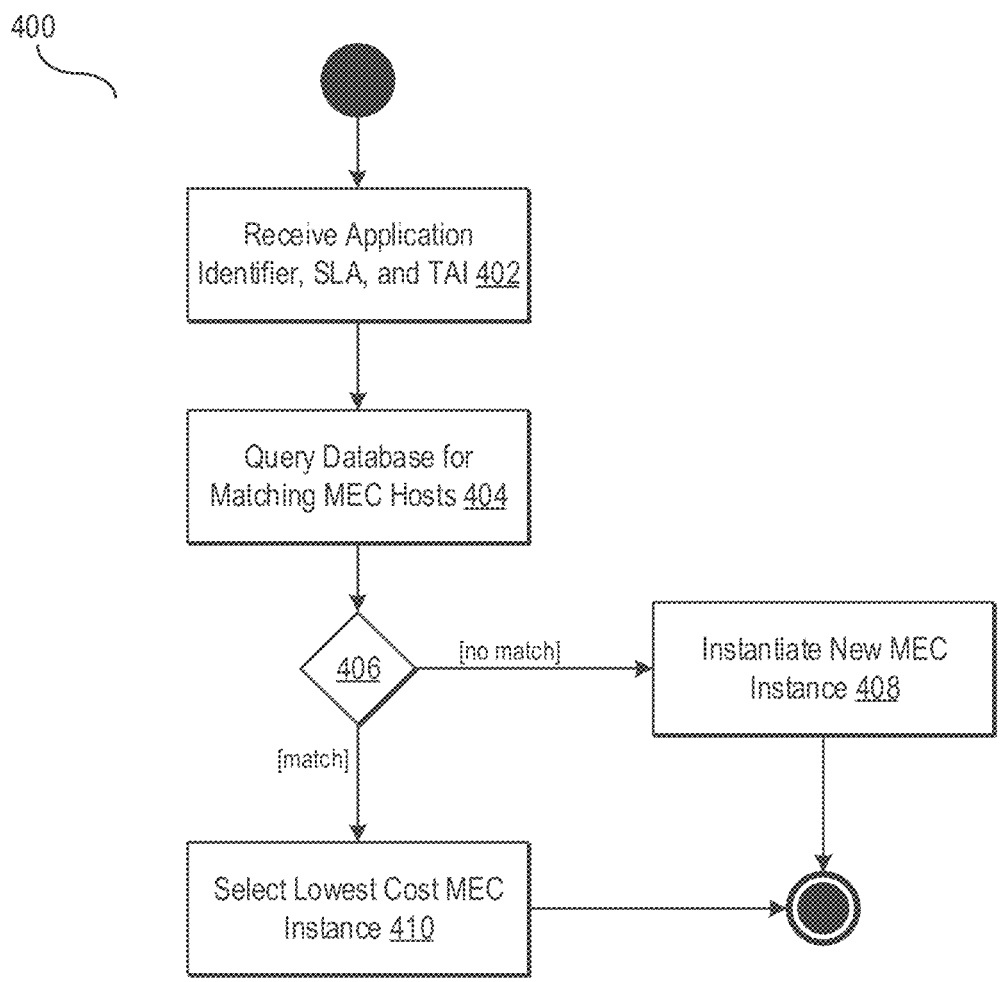
FIG. 4 is a flow diagram illustrating a method for querying a MEC SLA database according to some of the example embodiments.

FIG. 4 is a flow diagram illustrating a method (400) for querying a MEC SLA database according to some of the example embodiments.

In step 402, the method (400) can include receiving an application identifier, SLA, and TAI. As discussed in connection with FIG. 3, the application identifier, SLA, and TAI can be extracted from QoS reports generated by a session manager as well as based on requested SLA levels for given application identifiers.

In step 404, the method (400) can include querying a database for matching MEC hosts. In an embodiment, the database can comprise a relational database or similarly structured data store. In an embodiment, the method (400) can formulate a query using the application identifier, SLA, and TAI and issue the formulated query to the database. In an embodiment, the query can request all rows matching the application identifier, having an SLA value (i.e., latency) better then or exceeding the requested SLA level, and having a range of TAIs that includes the received TAI. For example, using the table in FIG. 2, an application identifier of "App-1," an SLA value of 30, and a TAI of TAI-1 would return row 218 and row 220. If, instead, an SLA value of 20 were provided, only row 218 would be returned. Similarly, an application identifier of "App-2" or an SLA value of 10 would return no rows (if the table were limited to the rows depicted in FIG. 2).

In step 406, the method (400) includes determining if any matches were found.

In an embodiment, a match can comprise a row returned in response to the query. In some embodiments, a match can comprise a row returned in response to the query with a status of "in service." As illustrated in the examples above, in some instances, a query can return no rows (i.e., no available MEC application instances) or can only return rows that are out of service. In such a scenario, no available MEC application instances are available to re-route traffic to.

Thus, in such an embodiment, the method (400) can include instantiating a new MEC application instance in step 408. In an embodiment, the method (400) can issue a request to a MECO to instantiate a new MEC application instance at a designated MEC platform. In some embodiments, the method (400) can identify an ideal MEC platform based on the TAI and SLA requirements, similar to the querying operation above. For example, each TAI can be associated with a known latency, and these known latencies can be used to identify a TAI that will meet or exceeds the SLA requirements. As illustrated in MEC SLA database 200, a plurality of MEC platforms can be used to instantiate MEC application instances. Thus, the MECO can instantiate a new MEC application instance and return a success message to the method (400). In response, the method (400) can optionally update the database to include the new MEC application instance (including MEC platform identifier, TAI, latency, and the various other fields in the MEC SLA database 200). Further, the method (400) can use this new MEC application instance as a matching instance and proceed to step 410.

Once the method (400) identifies one or more matching MEC application instances, the method (400) can select the best MEC application instance. If a single MEC application instance is returned, the method (400) can use that single MEC application instance as the best MEC application instance. If, however, multiple MEC application instances are returned, the method (400) can sort the MEC application instances by a cost weight and choose the lowest cost MEC application instance. For example, a MEC application instance in DNAI-1 (closest to RAN) will likely have a higher cost than a DNAI-2 MEC application instance. Thus, if both MEC application instances satisfy the SLA, the method (400) may choose the lower cost MEC application instance. In some embodiments, customers may request that the method (400) use other sorting criteria. For example, the method (400) can always select the lowest latency MEC application instance regardless of cost.

Once the method (400) identifies the best MEC application instance, the method (400) ends, and the method (300) can proceed to re-route traffic to the best MEC application instance as described in FIG. 3.

Figure 5:
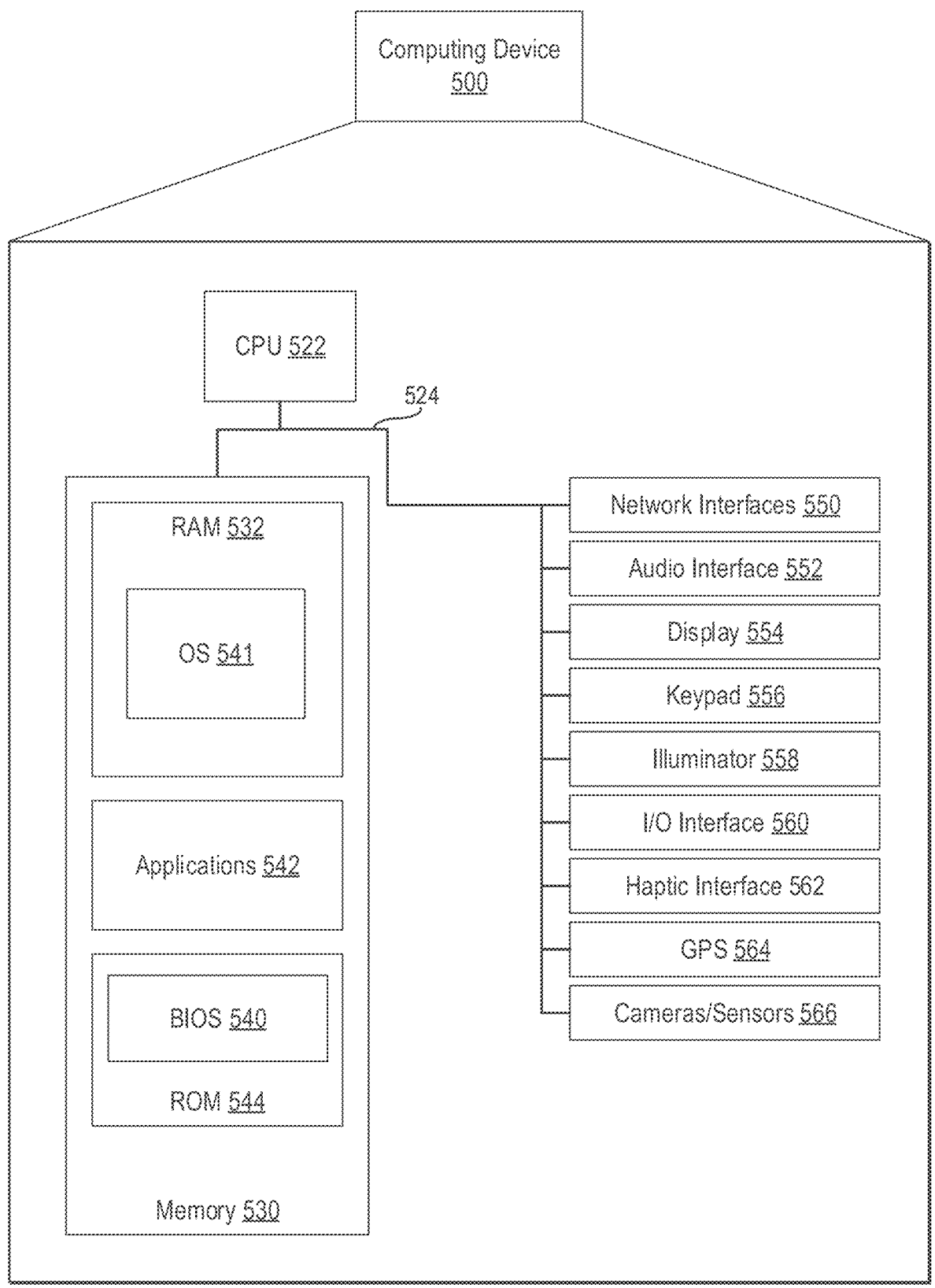
FIG. 5 is a block diagram illustrating a computing device showing an example of a client or server device used in the various embodiments.

FIG. 5 is a block diagram illustrating a computing device showing an example of a client or server device used in the various embodiments.

The computing device 500 may include more or fewer components than those shown in FIG. 5, depending on the deployment or usage of the computing device 500. For example, a server computing device, such as a rack-mounted server, may not include an audio interface 552, display 554, keypad 556, illuminator 558, haptic interface 562, Global Positioning System receiver 564, or sensors 566 (e.g., camera, temperature sensor, etc.). Some devices may include additional components not shown, such as graphics processing unit (GPU) devices, cryptographic coprocessors, artificial intelligence (AI) accelerators, or other peripheral devices.

As shown in the figure, the computing device 500 includes a central processing unit (CPU) 522 in communication with a mass memory 530 via a bus 524. The computing device 500 also includes a network interface 550, an audio interface 552, a display 554, a keypad 556, an illuminator 558, an input/output interface 560, a haptic interface 562, a Global Positioning System receiver 564, and cameras or sensors 566 (e.g., optical, thermal, or electromagnetic sensors). Computing device 500 can include sensors 566. The positioning of the sensors 566 on the computing device 500 can change per computing device 500 model, per computing device 500 capabilities, and the like, or some combination thereof.

In some embodiments, the CPU 522 may comprise a general-purpose CPU. The CPU 522 may comprise a single-core or multiple-core CPU. The CPU 522 may comprise a system-on-a-chip (SoC) or a similar embedded system. In some embodiments, a GPU may be used in place of, or in combination with, a CPU 522. Mass memory 530 may comprise a dynamic random-access memory (DRAM)

device, a static random-access memory device (SRAM), or a Flash (e.g., NAND Flash) memory device. In some embodiments, mass memory 530 may comprise a combination of such memory types. In one embodiment, the bus 524 may comprise a Peripheral Component Interconnect Express (PCIe) bus. In some embodiments, bus 524 may comprise multiple busses instead of a single bus.

Mass memory 530 illustrates another example of computer storage media for the storage of information such as computer-readable instructions, data structures, program modules, or other data. Mass memory 530 stores a basic input/output system, BIOS 540 in read-only memory (ROM) 544, for controlling the low-level operation of the computing device 500. The mass memory also stores an operating system 541 for controlling the operation of the computing device 500.

Applications 542 may include computer-executable instructions which, when executed by the computing device 500, perform any of the methods (or portions of the methods) described previously in the description of the preceding figures. In some embodiments, the software or programs implementing the method embodiments can be read from a hard disk drive (not illustrated) and temporarily stored in RAM 532 by CPU 522. CPU 522 may then read the software or data from RAM 532, process them, and store them to RAM 532 again.

The computing device 500 may optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 may be coupled to a speaker and microphone (not shown) to enable telecommunication with others or generate an audio acknowledgment for some action. Display 554 may be a liquid crystal display (LCD), gas plasma, light-emitting diode (LED), or any other type of display used with a computing device. Display 554 may also include a touch-sensitive screen arranged to receive input from an object such as a stylus or a digit from a human hand.

Keypad 556 may comprise any input device arranged to receive input from a user. Illuminator 558 may provide a status indication or provide light.

The computing device 500 also comprises an input/output interface 560 for communicating with external devices, using communication technologies, such as USB, infrared, Bluetooth™, or the like. The haptic interface 562 provides tactile feedback to a user of the client device.

The Global Positioning System receiver 564 can determine the physical coordinates of the computing device 500 on the surface of the Earth, which typically outputs a location as latitude and longitude values. Global Positioning System receiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the example embodiments as set forth in the claims that follow. The specification and drawings are accordingly to be regarded in an illustrative rather than restrictive sense.

We claim:

1. A method comprising:
monitoring a quality of service (QOS) of a data session between a user equipment (UE) and an application;
determining that the QoS of the data session does not meet a service level agreement (SLA) based on comparing a QoS report generated by a session management function (SMF) with SLA notifications received from a network data analytics function, the SLA notifications comprising metrics aggregated over a reporting period; and
in response to determining that the QoS of the data session does not meet the SLA:
extracting a UE location from the QoS report,
identifying, using the UE location and a quality metric stored in a database of multi-access edge computing (MEC) applications, a MEC host that meets the SLA, and
re-routing the data session to the MEC host.

2. The method of claim 1, wherein the database of MEC applications includes data representing at least one instance of a MEC application, the data including an application identifier field, a latency field, and cost weight field.

3. The method of claim 2, wherein identifying the MEC host comprises querying the database using the SLA, an identifier of a MEC application, and a location.

4. The method of claim 2, wherein identifying the MEC host comprises querying the database using a tracking area identifier (TAI).

5. The method of claim 2, wherein identifying the MEC host comprises identifying an instance in the database of MEC applications that matches a location, an identifier of a MEC application, and the SLA and sorting matching instances by the cost weight field.

6. The method of claim 1, further comprising instantiating the application in the MEC host before re-routing the data session.

7. The method of claim 1, wherein re-routing the data session to the MEC host comprises transmitting a Traffic Influence request, the Traffic Influence request including a QoS monitoring request parameter.

8. The method of claim 1, wherein the application comprises a centralized application external to a core network and wherein re-routing the data session to the MEC host comprises re-routing the data session to a version of the application executing on the MEC host.

9. A non-transitory computer-readable storage medium for storing instructions capable of being executed by a processor, the instructions defining steps of:
monitoring a quality of service (QOS) of a data session between a user equipment (UE) and an application;
determining that the QoS of the data session does not meet a service level agreement (SLA) based on comparing a QoS report generated by a session management function (SMF) with SLA notifications received from network data analytics function, the SLA notifications comprising metrics aggregated over a reporting period; and
in response to determining that the QoS of the data session does not meet the SLA:
extracting a UE location from the QoS report,
identifying, using the UE location and a quality metric stored in a database of multi-access edge computing (MEC) applications, a MEC host that meets the SLA, and
re-routing the data session to the MEC host.

10. The non-transitory computer-readable storage medium of claim 9, wherein the database of MEC applications includes data representing at least one instance of a MEC application, the data including an application identifier field, a latency field, and cost weight field.

11. The non-transitory computer-readable storage medium of claim 10, wherein identifying the MEC host comprises querying the database using the SLA, an identifier of a MEC application, and a location.

12. The non-transitory computer-readable storage medium of claim 10, wherein identifying the MEC host comprises querying the database using a tracking area identifier (TAI).

13. The non-transitory computer-readable storage medium of claim 12, wherein identifying the MEC host comprises identifying an instance in the database of MEC applications that matches a location, an identifier of a MEC application, and the SLA, and sorting matching instances by the cost weight field.

14. The non-transitory computer-readable storage medium of claim 9, the steps further comprising instantiating the application in the MEC host before re-routing the data session.

15. The non-transitory computer-readable storage medium of claim 9, wherein re-routing the data session to the MEC host comprises transmitting a Traffic Influence request, the Traffic Influence request including a QoS monitoring request parameter.

16. The non-transitory computer-readable storage medium of claim 9, wherein the application comprises a centralized application external to a core network and wherein re-routing the data session to the MEC host comprises re-routing the data session to a version of the application executing on the MEC host.

17. A device comprising:
a processor configured to:
monitor a quality of service (QOS) of a data session between a user equipment (UE) and an application,
determine that the QoS of the data session does not meet a service level agreement (SLA) based comparing a QoS report generated by a session management function (SMF) with SLA notifications received from network data analytics function, the SLA notifications comprising metrics aggregated over a reporting period, and in response to determining that the QoS of the data session does not meet the SLA:
extract a UE location from the QoS report,
identify, using the UE location and a quality metric stored in a database of multi-access edge computing (MEC) applications, a MEC host that meets the SLA, and
re-route the data session to the MEC host.

18. The device of claim 17, wherein the database of MEC applications includes data representing at least one instance of a MEC application, the data including an application identifier field, a latency field, and cost weight field.

19. The device of claim 17, wherein re-routing the data session to the MEC host comprises transmitting a Traffic Influence request, the Traffic Influence request including a QoS monitoring request parameter.

20. The device of claim 17, wherein the application comprises a centralized application external to a core network and wherein re-routing the data session to the MEC host comprises re-routing the data session to a version of the application executing on the MEC host.

* * * * *